(12) United States Patent
Mahajan

(10) Patent No.: US 8,828,124 B1
(45) Date of Patent: Sep. 9, 2014

(54) BIOGAS PURIFICATION APPARATUS AND METHOD FOR OPERATION THEREOF

(75) Inventor: Devinder Mahajan, South Setauket, NY (US)

(73) Assignee: The Research Foundation of State University of New York, Albany, NY (US)

( * ) Notice: Subject to any disclaimer, the term of this patent is extended or adjusted under 35 U.S.C. 154(b) by 286 days.

(21) Appl. No.: 13/311,091

(22) Filed: Dec. 5, 2011

Related U.S. Application Data

(62) Division of application No. 61/419,583, filed on Dec. 3, 2010.

(51) Int. Cl.
*B01D 53/00* (2006.01)

(52) U.S. Cl.
USPC .......................... 95/288; 55/DIG. 15; 62/55.5

(58) Field of Classification Search
USPC .......................... 95/288; 62/55.5; 55/DIG. 15
See application file for complete search history.

(56) References Cited

U.S. PATENT DOCUMENTS

| 8,007,567 B2 | 8/2011 | Roe et al. |
| 8,119,078 B2 * | 2/2012 | Rogers et al. ................. 422/242 |
| 2010/0021979 A1 | 1/2010 | Facey et al. |
| 2010/0107872 A1 | 5/2010 | Bethell |
| 2011/0023497 A1 | 2/2011 | Assmann |

* cited by examiner

*Primary Examiner* — Robert A Hopkins
(74) *Attorney, Agent, or Firm* — The Farrell Law Firm, P.C.

(57) ABSTRACT

A biogas purification method includes injecting biogas into a pressure vessel, cooling the pressure vessel to a first predetermined temperature and pressurizing the pressure vessel to a predetermined pressure. The method further includes visually monitoring separation of a biogas impurity from a product gas during an induction period, isolating the product gas from the biogas impurity at a clathrate formation equilibrium by removing the product gas from the pressure vessel and passing the product gas through water to yield a purified gas.

18 Claims, 3 Drawing Sheets

BIOGAS PURIFICATION APPARATUS AND METHOD FOR OPERATION THEREOF

PRIORITY

This application claims priority to U.S. Provisional Application No. 61/419,583, filed with the U.S. Patent and Trademark Office on Dec. 3, 2010, the contents of which are incorporated herein by reference.

BACKGROUND OF THE INVENTION

1. Field of the Invention

The present invention relates to a method and apparatus for biogas purification.

2. Description of the Related Art

Biological transformation of organic material in landfills produces biogas as a result of anaerobic digestion. The organic material includes energy crops, food and farm waste, such as animal manure. Biogas is a mixture of 55-65% methane ($CH_4$), 35-45% carbon dioxide ($CO_2$), and 2-5% nitrogen ($N_2$), with trace amounts of hydrogen sulfide ($H_2S$), carbon monoxide (CO) and water vapor ($H_2O$). $CH_4$ is the main constituent of biogas and is twenty times more potent as a greenhouse gas than $CO_2$. Under normal conditions biogas gas from landfills escapes into the atmosphere and contributes to global warming through the addition of greenhouse gases, such as $CO_2$ and $CH_4$. Accordingly, agricultural methane offsets, e.g. carbon credits, are being offered to farmers to minimize $CH_4$ release to the atmosphere, and alternative uses for biogas have drawn increased interest as a renewable energy source due to its $CH_4$ content.

Anaerobic digestion is a process where microorganisms decompose organic material and produce biogas as a byproduct. Anaerobic digestion generally occurs in two steps: conversion of organic wastes to organic acids such as acetic acid and propionic acid; and transformation of organic acids to biogas. Solids remaining after biogas production are referred to as digestate, which is high in phosphorous and fiber, and has a liquid fraction high in nitrogen, which can be used for fertilization and soil management.

Processing animal manure by anaerobic digestion has received attention as a method to produce biogas, as well as to reduce odors and manage nutrients flowing into the surrounding environment. Conventional biogas processing systems include U.S. Pat. No. 8,007,567 to Roe, et al., and U.S. Publ. No. 2010/0107872 A1, U.S. Publ. No. 2010/0021979 A1 and U.S. Publ. No. 2011/0023497 A1 to Bethell, Facey et al. and Assmann, respectively, the contents of which are incorporated herein by reference.

Anaerobic digesters typically utilize a series of processes in which microorganisms break down biodegradable material in the absence of oxygen. Three factors are considered to optimize biogas yield in the anaerobic digester: pH control; temperature, generally maintained at 100° F.; and an amount of water added to the digestate.

The net energy produced in the anaerobic digester is about 18,000 BTU/day per dairy cow (385 kW-hour/day equivalent per dairy cow), assuming that 35% of the energy is used for digester heating. The capital cost of a digester varies from $200-$700 per 1000 lbs. live weight of digestate being processed, with an estimated annual operating cost between $11,000-$51,000 per 1000 lbs. live weight. In the U.S., several types of digesters are in use, including a plug-flow type, complete mix type, and covered lagoon type.

An anaerobic digester will produce approximately 20-25 megajoules per cubic meter ($MJ/m^3$), with a typical biogas composition shown in Table 1.

TABLE 1

| Component | Content, vol. % |
|---|---|
| $CH_4$ | 55-70 vol. % |
| $CO_2$ | 30-45 vol. % |
| $H_2S$ | 200-4000 ppm |
| Ammonia ($NH_3$) | 0-350 ppm |
| Humidity | Saturated |

$CH_4$ is the primary desirable constituent as raw biogas exits a digester. Other gases, including $CO_2$, $H_2S$, $NH_3$, $N_2$, CO, and hydrogen ($H_2$) will lower a biogas heating value, and are preferably removed. In addition, $CO_2$ and $H_2S$ cause corrosion, and are preferably separated from biogas, generally by absorption in aqueous solutions by monoethanolamine and diethanolamine, as summarized in Table 2.

TABLE 2

| Component | Impact | Removal Methods |
|---|---|---|
| $CO_2$ | Heating value reduction | Water or caustic scrubbing; Solid or liquid absorption; Pressure separation |
| $H_2S$ | Highly corrosive | Passing through iron sponge or wood shavings mixed with iron oxide below 500 ppm |
| $H_2O$ | Condensation; metal surface corrosion when combined with $H_2S$ | Passing through frost-proof condensers |

Stepwise removal of $CO_2$, $H_2S$, and $H_2O$ enriches biogas to a purified $CH_4$ composition and raises the biogas heating value. However, current purification methods of biogas substantially add to $CH_4$ production cost and hinder use of biogas as a renewable energy source.

For example, conventional methods that use polymeric membranes of high permeability and selectivity for $CO_2/H_2S$ are limited in that they are energy-intensive, cause pollution, require solvent-regeneration, have large space requirements, have high labor costs for control and maintenance, and the corrosive nature of the solvents causes membrane fouling. Purification by liquefaction is expensive because liquefaction requires extreme conditions, i.e., biogas liquefies at −82.5° C. under 4.75 MPa.

Water scrubbing technology is simple and remains the preferred method of purifying biogas. For example, purification of raw biogas having an initial $CH_4$ content of 55%-65% in a digester based on the water scrubbing technology will typically result in a final methane content of 75%-95% (equivalent to 28.7 $MJ/m^3$ gas energy output) in a 210 $m^3$ gas/day production plant that utilized water under pressure at 1.3 MPa. A corresponding energy requirement of a plant is 1082 MJ/day, yielding an overall plant efficiency of 70%. However, two major limitations of biogas purification by water scrubbing are the need for a large amount of water, with such water requirement being prohibitive in areas having scarce water resources, and utilization of water spray under a high pressure of about 1.3 Mpa, typically requiring a steel tower for such spray.

An alternative method of biogas purification is to form clathrates, i.e. hydrates, of biogas impurities and to separate $CH_4$ from the biogas impurities to yield pipeline quality $CH_4$. Pipeline natural gas is generally defined as being composed of at least 70% methane by volume or having a gross calorific value between 950 and 1100 BTU per standard cubic foot.

FIG. 1 is a graph illustrating temperature and pressure conditions for clathrate formation of $H_2S$, ethane ($C_2H_6$), CO2, $CH_4$, propane ($C_3H_8$), and isobutane ($C_4H_{10}$). Clathrates are ice-like cages, which form from biogas by selective manipulation of temperature and pressure conditions. Water in the liquid phase facilitates clathrate formation when certain small gases are present, such as $CH_4$, $CO_2$, $H_2S$, $C_2H_6$, $C_3H_8$ and $C_4H_{10}$. The temperature and pressure conditions for clathrate formation are dependent on a particular gas molecule and can form from other larger hydrocarbon molecules and oxygenated hydrocarbon molecules such as tetrahydrofuran. Deposits of naturally occurring methane hydrates demonstrate a clathrate phenomenon under temperature and pressure conditions of T=2-4° C. and P~10 MPa, with $CO_2$ clathrate formation occurring under temperature and pressure conditions of T=2-4° C. and P<2 MPa, while $H_2S$ clathrates form at T=4° C. and P=2 MPa.

The conventional methods of clathrate formation from biogas described above employ stationary systems, which are impractical for biogas purification since the amount of biogas that is output from landfills, bio digesters, and wastewater treatment plants fluctuates and eventually declines in total amount of biogas output.

Accordingly, there is a need for an economical, mobile, safe and environmentally friendly alternative technology for purifying biogas, particularly to overcome the need of conventional water-scrubbing technologies for constant fresh water feed, which competes with more important daily usage of water for drinking and other basic human requirements.

SUMMARY OF THE INVENTION

The present invention overcomes the limitations of conventional systems and provides an apparatus and method that removes undesirable impurities in a single step to acceptable levels and transforms biogas into pipeline quality gas in the single step under temperatures of 0-10° C. and pressures of about 0-8 MPa.

An advantage of the present invention is that a limited amount of water is required and a need for a high pressure spray is avoided to purify biogas. In the present invention, water frozen as clathrate during the biogas purification process is allowed to warm up to release trapped gases such as $H_2S$ and $CO_2$. The released gases can be monitored by spectroscopic analysis, such as gas chromatography. The water is then recycled in the next biogas purification cycle. This water re-usage step sharply reduces water requirements for the entire process, making use of the process feasible in regions having limited water supplies.

An aspect of the present invention is to provide a biogas purification method including injecting biogas into a pressure vessel, cooling the pressure vessel to a first predetermined temperature and pressurizing the pressure vessel to a predetermined pressure. The method further includes visually monitoring separation of a biogas impurity from a product gas during an induction period, isolating the product gas from the biogas impurity at a clathrate formation equilibrium by removing the product gas from the pressure vessel and passing the product gas through water to yield a purified gas.

In accordance with an aspect of the present invention, a process for separating components of a gaseous mixture includes injecting the gaseous mixture into a pressure vessel, injecting an aqueous solution into the pressure vessel having a predetermined concentration of an anionic surfactant and cooling the pressure vessel to a predetermined temperature pressurizing the pressure vessel to a predetermined pressure. The method further includes visually monitoring separation of a gas impurity from a product gas during an induction period and isolating the product gas from the gas impurity at a clathrate formation equilibrium by removing the product gas from the pressure vessel.

An aspect of the present invention is to provide a skid-mounted apparatus for biogas purification. The skid-mounted apparatus includes a pressure vessel, a dip tube for injecting biogas into an aqueous solution within the pressure vessel, a site glass for visual monitoring of clathrate formation and a gas outlet for removing a product gas. Visual monitoring of the clathrate formation includes monitoring separation of a biogas impurity from the product gas during a clathrate formation period.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

The following detailed description of the preferred embodiments will be made with reference to the accompanying drawings. In the description provided herein, explanation of related functions or constructions known in the art are omitted for the sake of clarity in understanding while avoiding obscuring the concept with unnecessary detail.

Figure 1:
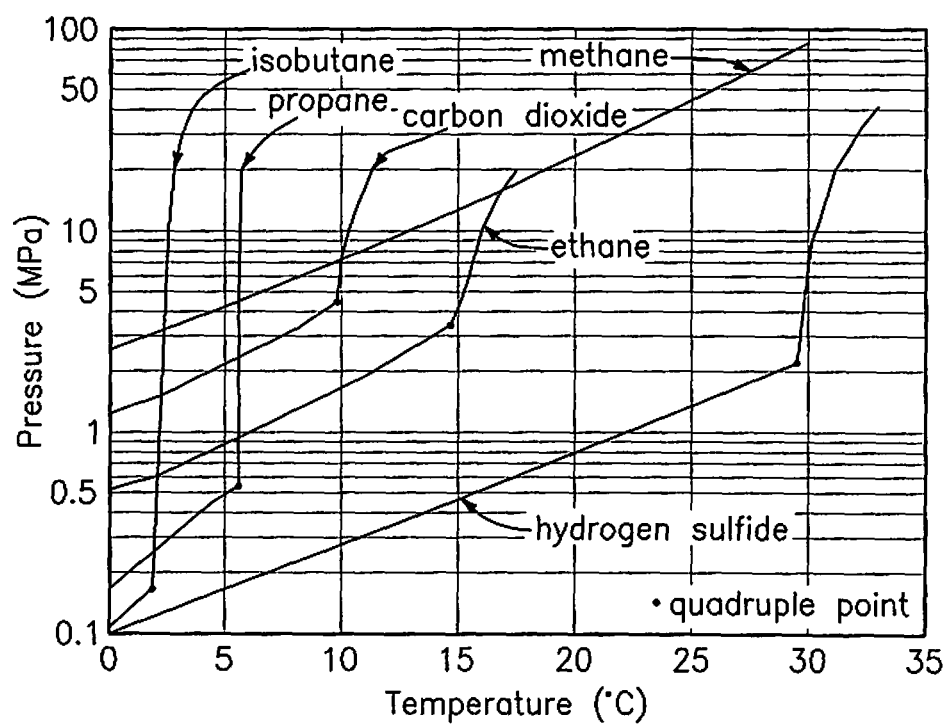
FIG. 1 is a graph illustrating temperature and pressure conditions for clathrate formation of select gases.
Figure 2:
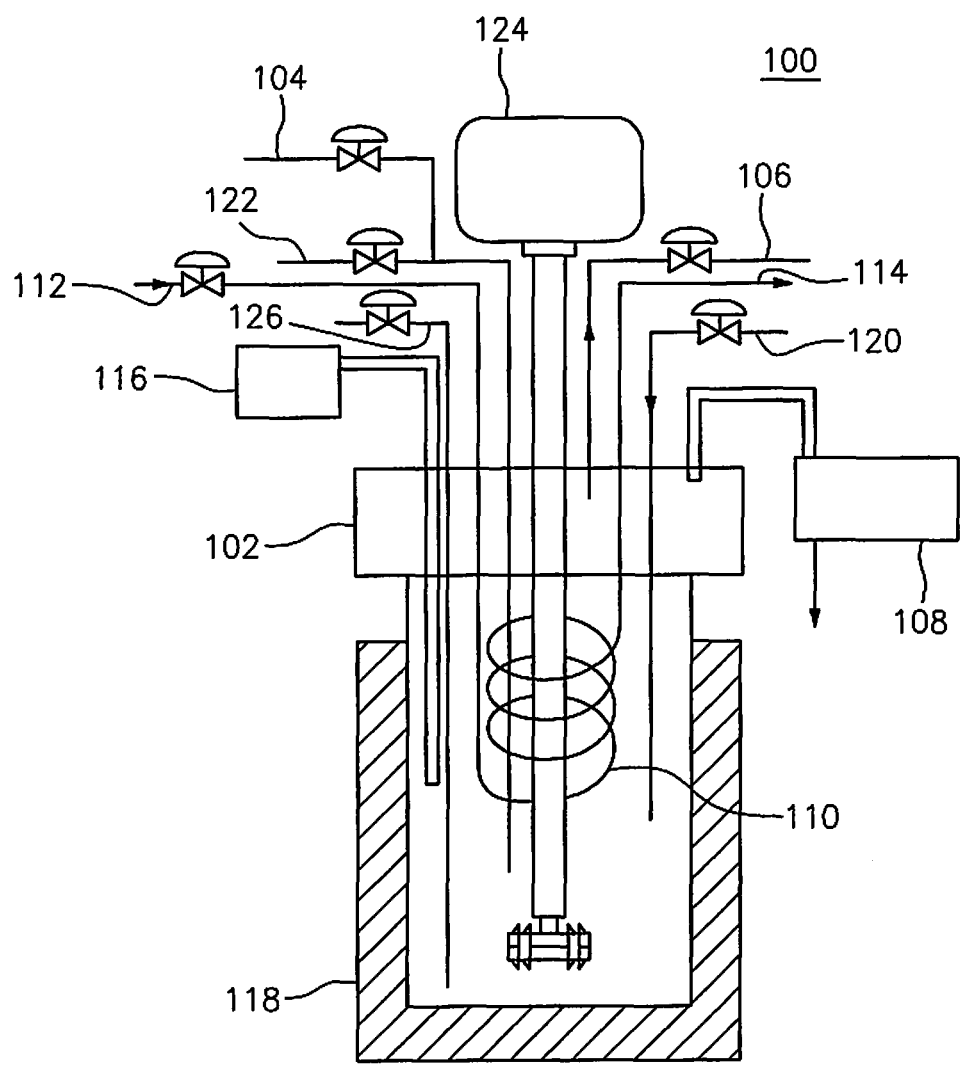
FIG. 2 illustrates a mobile biogas purification apparatus according to an embodiment of the present invention.

FIG. 2 illustrates a mobile biogas purification apparatus 100 according to an embodiment of the present invention. The biogas purification apparatus 100 includes an enclosed stainless steel pressure vessel 102 with a gas inlet 104 for injecting biogas into the pressure vessel 102 and a gas outlet 106 for isolating a product gas after separation from a biogas impurity. The size of the pressure vessel 102 in which biogas is held can be adjusted as needed for large-scale purification, depending on biogas processing requirements. A sample port 122 is also provided for sampling the biogas during separation of the product gas from the biogas impurity. A pressure gauge 108 is provided to monitor pressure in the pressure vessel 102.

The biogas purification apparatus 100 also includes a temperature controller 116 for monitoring and adjusting the interior temperature and a heating mantle 118 for warming the pressure vessel 102. The temperature controller 116 and the pressure gauge 108 are preferably controlled by software such as LabVIEW™ to monitor the temperature and pressure within the pressure vessel 102.

A cooling coil 110 is wrapped around the interior of the pressure vessel 102. The cooling coil 110 includes a coolant inlet 112 and a coolant exit 114 for cooling the interior of the pressure vessel 102. Circulating glycol solution through the cooling coil 110 preferably cools the pressure vessel 102.

In a preferred embodiment, the biogas purification apparatus 100 includes a liquid/gas inlet 120 for injecting liquids and/or gases into the pressure vessel 102 and a dip tube 126 extending to a bottom portion of the pressure vessel 102 for bubbling gases into a liquid present in the pressure vessel 102. The biogas purification apparatus 100 preferably includes a stirrer 124 for stirring and/or agitating liquids and gases within the pressure vessel 102.

The pressure vessel 102 includes a site glass window (not shown) made of borosilicate glass that can withstand pressures of up to 15 MPa. The site glass window allows for visual monitoring of clathrate formation. The formation of clathrates of $CO_2$ and $H_2S$ are observed as white solids that appear as ice within the pressure vessel 102. The site glass window allows for observation of clathrate formation, and if the clathrates do not form, temperature and pressure conditions are adjusted to facilitate clathrate formation.

The biogas purification apparatus 100 is a mobile apparatus. Conventional biogas purification units are built on-site. In a preferred embodiment, the biogas purification apparatus 100 is mounted on a platform, such as a skid or pallet, so that the biogas purification apparatus 100 can be moved from site to site as required. The mobile biogas purification apparatus 100 unit only requires electricity and water on-site to process biogas, reducing capital and operating costs. The compact and mobile design makes this embodiment economical for methane production. A large-scale purification apparatus is also obtainable, preferably with a plurality of site glass windows.

A modular approach provides an alternative embodiment of the large-scale biogas purification apparatus described above, wherein a series of pressure vessels are connected to process larger volumes of biogas. For example, the gas inlets 104 of a series of the large-scale biogas purification apparatuses are connected to a common gas inlet for injection of raw biogas. Similarly, the gas outlets 106 are connected to a common gas outlet for isolation of the product gas after separation. The modular approach to biogas purification allows for optimization of electricity and water usage, while avoiding potential dangers and complications of large pressure vessels subjected to high pressures.

Figure 3:
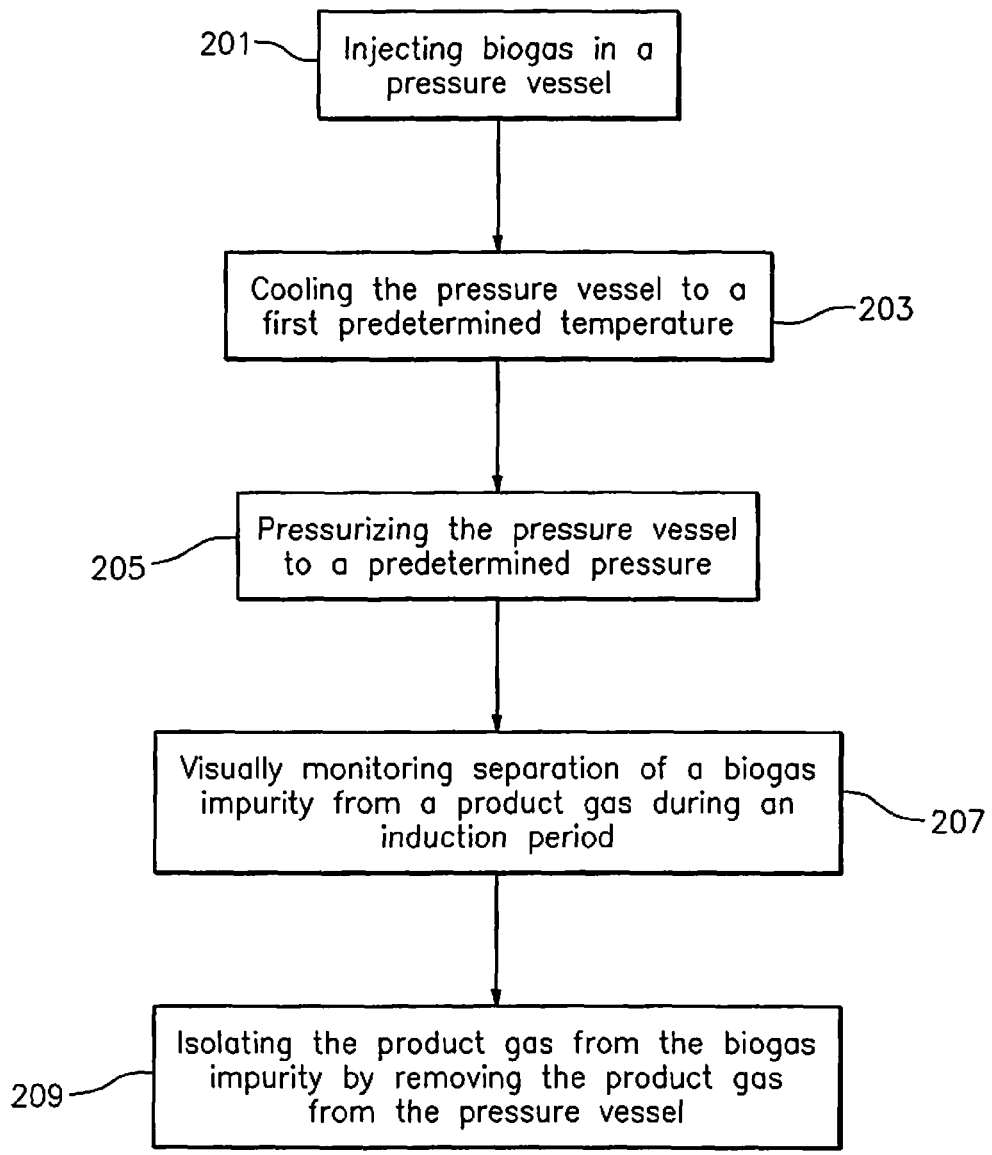
FIG. 3 illustrates a method of purifying biogas according to an embodiment of the present invention.

FIG. 3 illustrates a method of purifying biogas. The method includes injecting biogas in a pressure vessel 102 in step 201, cooling the biogas to a first predetermined temperature in step 203 and pressurizing the biogas to a predetermined pressure in step 205. When the pressure vessel 202 reaches the first predetermined temperature and the predetermined pressure, clathrates of a biogas impurity form within the pressure vessel 102, after an induction period. However, at the first predetermined temperature and the predetermined pressure, $CH_4$ remains a gas, and thus, $CH_4$ separates from the biogas impurity. In a preferred embodiment, an aqueous solution of distilled water and a predetermined concentration of an anionic surfactant is injected into the pressure vessel 102 through the liquid/gas inlet 120.

The anionic surfactant is preferably Sodium Dodecyl Sulphate (SDS) and the predetermined concentration is about 0-1000 parts per million (ppm). Other similar anionic and/or cationic surfactants used as hydrate promoters are preferably used in place of SDS. The surfactants include amphiphilic organic and/or inorganic molecules including: ammonium lauryl sulfate, benzalkonium chloride, dimethyldioctadecylammonium chloride, sodium dodecylbenzenesulfonate, sodium laureth sulfate, sodium lauroyl sarcosinate, sodium myreth sulfate, sodium stearate, and tetramethylammonium hydroxide.

During the induction period, separation of a product gas from a biogas impurity occurs. The separation is visually monitored in step 207 and the induction period ends upon observation of the formation of clathrates. After the induction period, a clathrate formation period occurs, where clathrates of the biogas impurity form within the pressure vessel 102. The clathrate formation period proceeds for less than one hour and ends upon reaching a clathrate formation equilibrium, which is the point clathrate formation stops.

The method also includes isolating the product gas from the biogas impurity when the biogas reaches the clathrate formation equilibrium. Isolation of the product gas occurs by depressurizing the pressure vessel to remove the separated product gas from the pressure vessel 102 in step 209. The product gas is a composition of $CH_4$ and $CO_2$ and the biogas impurity is a composition of $H_2S$ and $CO_2$, as described in more detail below. The product gas is preferably removed by opening the gas outlet 106 and depressurizing the pressure vessel 102. The biogas impurity remains in the pressure vessel as frozen clathrates, thus providing biogas containing a higher percentage of $CH_4$ than present in the injected biogas.

After depressurization, the biogas impurity begins to melt and is released into the pressure vessel 102 as a gas byproduct. In a preferred embodiment, the pressure vessel 102 is warmed slightly to a temperature of about 2-25° C., or preferably 10° C. or higher. Warming the pressure vessel 102 allows for recycling of the aqueous solution in that the gas byproduct is removed, leaving only the aqueous solution remaining for subsequent purification batches. The separated biogas is preferably sampled within the pressure vessel to determine whether separation of methane and the biogas impurity has occurred during the clathrate formation period. If the sampled biogas has reached a desired purity, i.e., a sufficient percentage of $CH_4$ has separated from the biogas impurity, the pressure vessel is depressurized to remove the separated product gas. However, if the sampled biogas has not reached the desired purity, separation of the biogas impurity from the product gas is allowed to proceed.

In a preferred embodiment, a biogas is a gaseous mixture having a composition of 55-65% $CH_4$, 35-45% $CO_2$, 2-5% $N_2$, and small amounts of trace gases including $H_2S$, $O_2$, CO and $H_2O$. The biogas is injected into the pressure vessel 102 and cooled to the predetermined temperature of about 0-10° C., or preferably below 5° C., and a predetermined pressure of about 0-8 MPa, or preferably less than or equal to 2 MPa. During an induction period, i.e., prior to when nucleation starts and clathrates begin to form, both $CO_2$ and $H_2S$ molecules begin separating from the $CH_4$. More specifically, the induction period is the time period during which the pressure vessel 102 and the solution are cold but no solid clathrate is observed and proceeds from a few minutes up to 24 hours. The induction period ends as soon as solid clathrates appear. Some trace gases remain in a gaseous state and exit the pressure vessel 102 with the $CH_4$. Since $CH_4$ hydrates require much higher pressures (>8 MPa) to form at these temperatures, $CH_4$ remains a gas.

After the induction period, a clathrate formation period occurs for preferably between about 1 minute and 1 hour. Upon reaching a clathrate formation equilibrium, a product gas is removed from the pressure vessel 102, isolating the product gas from the biogas impurity. A shorter process is preferred, but there is generally no harm to extending the process. However, if all of the aqueous solution is frozen, separation of the product gas and the biogas impurity will no longer proceed and the product gas is isolated. The product gas has a $CH_4$ content of at least about 70% and a $CO_2$ content of about 30%, with some trace gases included. Thus, the product gas has a higher heating value than the injected biogas and qualifies as pipeline quality gas.

To achieve higher purities, a purification step is performed after isolating the product gas. Specifically, the product gas is passed through water at room temperature, i.e., water between 15-25° C. The purification step removes any remaining $CO_2$ and $H_2S$ providing a purified gas composition of at least 95% $CH_4$. It is preferred to perform the purification step after removing the product gas from the pressure vessel 102 to minimize water usage. The purification step is carried out in a low-pressure vessel by bubbling the product gas through water and removing the purified gas.

The following examples demonstrate purification of raw biogas containing impurities using the method and apparatus described above. Modifications of the method and apparatus provided below represent preferred embodiments of the invention, but do not limit the embodiments previously described.

Example 1

The pressure vessel 102 is an enclosed 200 mL stainless steel vessel fitted with borosilicate glass windows along a length of the pressure vessel 102. For example, the windows are 1-14 inches long and one inch wide. The pressure vessel 102 can withstand pressures of up to 15 MPa and temperatures as low as −10° C. The windows allow for real time direct visual observation of clathrate formation in the pressure vessel 102 while the biogas purification reaction is in progress. The visualization feature simplifies monitoring of the reaction, and the reaction is generally stopped within 1-30 minutes into the clathrate formation period.

The pressure vessel 102 is also fitted with the dip tube 126 through which impure biogas enters the vessel. The dip tube 126 extends below the liquid level in the pressure vessel, whereas the gas inlet 104 remains above the liquid level. In the present embodiment, the dip tube 126 forces the entering biogas through an aqeuous solution provided within the pressure vessel 102 allowing for efficient gas/liquid mixing. The solution quickly becomes saturated with the impure biogas and the resulting gas/liquid ratio hastens clathrate formation to remove impurities, such as $H_2S$ and $CO_2$. The pressure gauge 108 and the temperature controller 116 allow complete control over the progress of the separation of $CH_4$ from the impurities.

Example 2

The pressure vessel 102 is initially cooled to between 1° C.-5° C. and biogas is then introduced. Alternatively, an aqueous solution within the pressure vessel 102 is cooled to between 1° C.-5° C. after biogas is introduced to the vessel.

Example 3

The pressure vessel 102 of a 200 mL volume is used. A 75 mL aqueous solution of distilled water and about 0-1000 parts per million (ppm) Sodium Dodecyl Sulphate (SDS), or more preferably 300 ppm of SDS, is injected into the pressure vessel 102 through the liquid/gas inlet 120. The addition of the SDS solution hastens hydrate formation. Then, $CO_2$ gas is gradually bubbled into the SDS solution through the dip tube and the pressure vessel 102 is cooled to a temperature of approximately 2° C.

The pressure and temperature values of the pressure vessel 102, 2° C. and 2 MPa, respectively, along with visual observation, indicate when the separation of the $CH_4$ from the impurities is at a clathrate formation equilibrium, which is the point where hydrate formation stops. Upon reaching equilibrium, white $CO_2$ hydrates accumulate in the aqueous phase, but not at the gas-liquid interface. The liquid interface does not freeze throughout the hydrate formation event, indicating that the hydrates are nucleated in bulk at the gas-liquid interface and then accumulate in the aqueous phase due to their higher density.

Example 4

The method described above for Example 3 was a baseline run for pure $CO_2$ hydrate formation. In this example, $CO_2$ gas is replaced with $CH_4$ and the method of Example 3 is repeated. After several hours, no white solid is detected, demonstrating that at 2° C. and 2 MPa pressure, the solution is outside the methane hydrate stability regime and the conditions are unfavorable for methane hydrate formation.

Example 5

The method of Example 3 is modified by using a mixture of 40% $CO_2$ and 60% $CH_4$ as the injected gas. After subjecting the gas mixture to the conditions in Example 3, a white solid is observed. Comparing initial and final gas analyses indicates that $CO_2$ content dropped by 30% from the initially injected gas.

Example 6

The run in Example 3 was repeated by replacing pure $CO_2$ with a gas mixture containing 40% $CO_2$, 58% $CH_4$ and 2% $H_2S$, a typical composition of biogas. A white solid is observed in the vessel after the induction period after a period of 1-10 hours. Once the solid formation starts after the induction period, the clathrate formation period preferably takes less than one hour to complete. The product gas is isolated when hydrate formation reaches the clathrate formation equilibrium with the surrounding biogas. The composition of the isolated product gas is 24% $CO_2$ and 76% $CH_4$, demonstrating that both $H_2S$ and $CO_2$ decreased compared to the initially injected biogas.

While the disclosed method and apparatus have been shown and described with reference to certain exemplary embodiments thereof, it will be understood by those skilled in the art that various changes in form and details may be made therein without departing from the spirit and scope of the present invention as defined by the appended claims and equivalents thereof.

What is claimed is:

1. A biogas purification method comprising:
    injecting biogas into a pressure vessel;
    cooling the pressure vessel to a first predetermined temperature;
    pressurizing the pressure vessel to a predetermined pressure;
    visually monitoring separation of a biogas impurity from a product gas during an induction period;
    isolating the product gas from the biogas impurity at a clathrate formation equilibrium by removing the product gas from the pressure vessel; and
    passing the product gas through water to yield a purified gas.

2. The method of claim 1, wherein the first predetermined temperature is below 5° C.

3. The method of claim 1, wherein the predetermined pressure is less than or equal to 2 MPa.

4. The method of claim 1, wherein the biogas impurity is one of $CO_2$, $H_2O$ and $H_2S$.

5. The method of claim 1, further comprising, prior to cooling, injecting an aqueous solution having a predetermined concentration of an anionic surfactant into the pressure vessel.

6. The method of claim 5, wherein the anionic surfactant is Sodium Dodecyl Sulphate (SDS) and the predetermined concentration is about 300 ppm.

7. The method of claim 5, further comprising warming the pressure vessel to a second predetermined temperature to recycle the aqeuous solution.

8. The method of claim 7, wherein the second predetermined temperature is between 2° C. and 25° C.

9. The method of claim 1, wherein the product gas has a methane content of at least 70%.

10. The method of claim 1, wherein the purified gas is passed through water at room temperature.

11. The method of claim 10, wherein the purified gas has a methane content of at least 95%.

12. The method of claim 1, wherein biogas impurity formation ceases at clathrate formation equilibrium.

13. The method of claim 1, further comprising, prior to isolating the product gas, confirming that separation of the injected biogas and the biogas impurity has occurred by sampling the biogas within the pressure vessel.

14. The method of claim 1, further comprising injecting the biogas into the pressure vessel by bubbling the biogas into an aqueous Sodium Dodecyl Sulphate (SDS) solution having a predetermined concentration.

15. The method of claim 1, wherein hydrates of one of $CO_2$ and $H_2S$ form after the induction period.

16. The method of claim 1, wherein a clathrate formation period follows the induction period and ends at the clathrate formation equilibrium.

17. The method of claim 16, wherein the clathrate formation period proceeds for less than one hour.

18. A process for separating components of a gaseous mixture comprising:
   injecting the gaseous mixture into a pressure vessel;
   injecting an aqueous solution into the pressure vessel having a predetermined concentration of an anionic surfactant;
   cooling the pressure vessel to a predetermined temperature;
   pressurizing the pressure vessel;
   visually monitoring separation of a gas impurity from a product gas during an induction period; and
   isolating the product gas from the gas impurity at a clathrate formation equilibrium by removing the product gas from the pressure vessel.

* * * * *